United States Patent
Powell et al.

(10) Patent No.: US 11,305,651 B2
(45) Date of Patent: Apr. 19, 2022

(54) CONTROL OF VEHICLE SYSTEMS

(71) Applicant: JAGUAR LAND ROVER LIMITED, Coventry (GB)

(72) Inventors: Fiona Powell, Warwickshire (GB); Linh Nguyen, Warwickshire (GB); Thomas Popham, Warwickshire (GB); Krzysztof Kobylinski, Warwickshire (GB); Francis McCullough, Warwickshire (GB); Jonathan Randall, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 170 days.

(21) Appl. No.: 16/099,300

(22) PCT Filed: May 2, 2017

(86) PCT No.: PCT/EP2017/060364
§ 371 (c)(1),
(2) Date: Nov. 6, 2018

(87) PCT Pub. No.: WO2017/194347
PCT Pub. Date: Nov. 16, 2017

(65) Prior Publication Data
US 2019/0176624 A1    Jun. 13, 2019

(30) Foreign Application Priority Data
May 12, 2016    (GB) .................................... 1608324

(51) Int. Cl.
*B60K 35/00* (2006.01)
*B60H 1/00* (2006.01)
(Continued)

(52) U.S. Cl.
CPC ......... *B60K 35/00* (2013.01); *B60H 1/00657* (2013.01); *B60R 16/037* (2013.01);
(Continued)

(58) Field of Classification Search
CPC .... H04M 1/72533; H04M 1/44; G08C 17/02; G08C 2201/61; G08C 2201/91;
(Continued)

(56) References Cited

U.S. PATENT DOCUMENTS

| 8,527,146 B1 | 9/2013 | Jackson et al. |
| 2002/0067245 A1* | 6/2002 | Campbell ................ G07C 9/37 |
| | | 340/5.64 |

(Continued)

FOREIGN PATENT DOCUMENTS

DE    102010009759 A1    9/2011

OTHER PUBLICATIONS

International Search Report and Written Opinion, PCT/EP2017/060364, dated Jul. 18, 2017, 13 pp.
(Continued)

*Primary Examiner* — Anthony R Jimenez
(74) *Attorney, Agent, or Firm* — McCoy Russell LLP

(57) ABSTRACT

A shortcut system (1) for controlling at least one vehicle system (2), the shortcut system comprising: an input arranged to receive configuration signals (6) generated in response to a user operating a configuration device (7) independent of the vehicle (100), the configuration signals specifying an action to be carried out by a vehicle system; a memory module (5) arranged to store the action specified in a received configuration signal; a processor (4) arranged, upon a user-selected trigger condition being met, to generate a control signal (8) for controlling the vehicle system in accordance with the stored specified action; and an output arranged to output the control signal. Also a configuration (Continued)

device (7) independent of a vehicle (100) that is arranged to configure a shortcut system (1) for controlling at least one vehicle system (2) of the vehicle, and a method of controlling at least one vehicle system (2) of a vehicle (100).

20 Claims, 4 Drawing Sheets

(51) Int. Cl.
*B60W 50/00* (2006.01)
*B60R 16/037* (2006.01)
*G06K 9/00* (2006.01)
*G08C 17/02* (2006.01)

(52) U.S. Cl.
CPC ..... *B60W 50/0098* (2013.01); *G06K 9/00838* (2013.01); *B60K 2370/55* (2019.05); *B60K 2370/573* (2019.05); *B60K 2370/73* (2019.05); *B60W 2050/0064* (2013.01); *G08C 17/02* (2013.01); *G08C 2201/20* (2013.01); *G08C 2201/93* (2013.01)

(58) Field of Classification Search
CPC ............ G08C 2201/20; G08C 2201/93; G08C 2201/12; G08C 2201/30; G08C 2201/32; G08C 2201/34; H04W 12/06; H04W 4/44; H04W 4/006; H04W 4/046; B60Y 2304/076; B60Y 2410/111; H04L 67/12; H04L 67/123; H04L 67/125; H04L 67/303; F02N 11/00; F02N 11/08; G06K 9/00832; G06K 9/00838; G07C 9/00309; G07C 2009/00507; B60K 2370/739; B60K 2370/199; B60K 2370/589; B60K 2370/73; B60K 2370/55; B60K 2370/573; B60K 2350/00; B60K 2350/10; B60K 2350/1004; B60K 2350/1008; B60K 2350/1024; B60K 2350/35; B60K 2350/357; B60K 2350/92; B60K 2350/921; B60K 37/00; B60K 37/02; B60K 37/04; B60K 37/06; B60K 35/00; B60W 2556/50; B60W 50/085; B60W 50/0098; B60W 2050/0077; B60W 2050/0083; B60W 2050/0064; B60W 2050/0065; B60W 2050/0082; B60W 2540/00; B60W 2540/04; B60W 2540/043; B60W 2040/0881; B60W 2550/00; B60W 2550/40; B60R 16/037; B60H 1/00657; B60H 1/00778
USPC .......................................................... 701/36
See application file for complete search history.

(56) References Cited

U.S. PATENT DOCUMENTS

| 2012/0115446 | A1 | 5/2012 | Gautama et al. |
| 2013/0124009 | A1 | 5/2013 | Esler |
| 2013/0197674 | A1 | 8/2013 | Lowry |
| 2014/0195074 | A1 | 7/2014 | Hunt |
| 2015/0051754 | A1 | 2/2015 | Kwon et al. |
| 2015/0088337 | A1 | 3/2015 | Toohy et al. |
| 2015/0149042 | A1* | 5/2015 | Cooper .................. H04W 4/48 701/48 |
| 2015/0217777 | A1 | 8/2015 | Konigsberg |

OTHER PUBLICATIONS

Search and Examination Report, GB1608324.8, dated Nov. 11, 2018, 7 pp.

* cited by examiner

THE ACTION THAT YOU WANT TO HAPPEN                9

CREATE ACTION

THE TRIGGER THAT CAUSES THE ACTION TO HAPPEN

DEFINE TRIGGER

ACTION o                                          9

CHOOSE FROM THE LIST OF ACTIONS BELOW

9

○ TRIGGER

CHOOSE FROM THE LIST OF TRIGGERS BELOW

Time/day

Temperature

Occupants

Location

Distance/Duration

Devices

CONTROL OF VEHICLE SYSTEMS

CROSS-REFERENCE TO RELATED APPLICATIONS

This application is a 371 of International Application No. PCT/EP2017/060364, filed May 2, 2017, which claims priority to GB Patent Application 1608324.8, filed May 12, 2016, the contents of both of which are incorporated by reference herein in their entirety.

TECHNICAL FIELD

The present disclosure relates to the control of vehicle systems and particularly, but not exclusively, to a shortcut for controlling vehicle systems. Aspects of the invention relate to a shortcut system for controlling at least one vehicle system, to a vehicle provided with a shortcut system for controlling at least one vehicle system, to a configuration device independent of a vehicle that is arranged to configure a shortcut system for controlling at least one vehicle system of the vehicle, and to a method of controlling at least one vehicle system.

BACKGROUND

During use of a vehicle, a driver often wishes to perform various secondary tasks related to the control of various vehicle systems in addition to the primary task of driving the vehicle. Frequently performed secondary tasks include, for example, pairing a phone with the vehicle, playing a particular music source, engaging a particular driving mode, and controlling the heating and air conditioning system, as well as turning on and/or adjusting many other vehicle systems. Performing these secondary tasks generally requires the driver or a passenger to manually control each of the desired secondary systems, which can be time consuming and inconvenient.

In addition, a driver often knows before commencing a drive which vehicle systems they are likely to use, and which settings they are likely to select. However, drivers typically have to wait until they have entered their car at the start of a drive to activate the desired vehicle systems and engage the desired settings.

The present invention has been devised to mitigate or overcome at least some of the above-mentioned problems.

SUMMARY OF THE INVENTION

Aspects and embodiments of the invention provide a shortcut system for controlling at least one vehicle system, a vehicle provided with such a shortcut system, a configuration device independent of a vehicle that is arranged to configure a shortcut system for controlling at least one vehicle system of the vehicle, and to a method of controlling at least one vehicle system as claimed in the appended claims.

According to an aspect of the present invention there is provided a shortcut system for controlling at least one vehicle system, the shortcut system comprising:
an input arranged to receive a configuration signal generated in response to a user operating a configuration device independent of the vehicle, the configuration signal specifying an action to be carried out by a vehicle system;
a memory module arranged to store the action specified in a received configuration signal;
a processor arranged, upon a user-selected trigger condition being met, to generate a control signal for controlling the vehicle system in accordance with the stored specified action; and
an output arranged to output the control signal.

The invention allows a user of a vehicle to pre-program personalised actions to be carried out by one or more vehicle systems automatically in response to a user-selected trigger condition being met. It is therefore possible to control the one or more vehicle systems without requiring any intervention from the user at the desired time of use.

By independent of the vehicle it is meant that the configuration device is not comprised in the vehicle. The configuration device may, for example, be a portable communications device (such as a mobile phone), or a tablet device, or a lap-top computer, or a desk-top computer, or a smartwatch, as described in more detail below. Using the configuration device, it is possible to pre-program desired actions from outside the vehicle, for example before a commute. It will be appreciated that although the configuration device is independent of the vehicle and may be operated from outside the vehicle, the configuration device may in some cases also be operated from within the vehicle, for example where the configuration device is a mobile phone or smartwatch.

The shortcut system is reconfigurable, and may be reconfigured, for example, by adding a new action and trigger condition pair, or by removing or changing an existing action and trigger condition pair that has already been stored.

It will be understood that the user is a normal user of the vehicle and not a maintenance person.

The memory module may be arranged to store a specified action to be carried out by vehicle systems relating to at least one of: navigation, comfort, entertainment, interior configuration, security, vehicle cameras, wing mirror control, tow bar deployment/retraction, Advanced Driver Assistance Systems (ADAS) and/or telephone/media features. Actions relating to entertainment may include, for example, actions relating to media source input selection, volume control, balance control etc.

The memory module may be arranged to store a specified action comprising activating a specified vehicle system. The specified action may, for example, comprise "turn on the air conditioning system".

The memory module may be arranged to store a specified action comprising setting a specific vehicle system to operate according to a selected mode of operation. The specified action may, for example, comprise "set the air conditioning system to X degrees Celsius".

The memory module may be arranged to store two or more specified actions to be carried out by vehicle system(s), and the processor may be arranged, upon the trigger condition being met, to generate control signals for controlling the vehicle system(s) in accordance with the two or more stored specified actions. The shortcut system can therefore enable multiple personalised actions (either for a single vehicle system or for multiple vehicle systems) to be pre-programmed to be carried out upon a single trigger condition being met. The two or more specified actions may relate to different vehicle systems, which may be unrelated vehicle systems.

The memory module may be arranged to store two or more specified actions to be carried out by vehicle system(s), the two or more actions corresponding respectively to two or more different user-selected trigger conditions, and the processor may be arranged, upon one of the trigger conditions being met, to generate a control signal for controlling a vehicle system in accordance with the stored specified action corresponding to that trigger condition. The shortcut system can therefore enable personalised actions to be pre-programmed corresponding to multiple different trigger conditions. The different trigger conditions need not be related to each other, and the specified actions corresponding to each trigger condition may be for different vehicle systems.

The processor may be arranged to prioritise the generation of control signals based on vehicle occupancy and/or detection of one or more specified portable devices in proximity to the vehicle. For example, where multiple different configuration devices are used to configure the shortcut system, the processor may prioritise the configuration options selected using one of the configuration devices over the configuration options selected using other configuration devices when more than one of the configuration devices are detected in proximity to the vehicle.

The input may be arranged to receive configuration signals specifying a trigger condition for an action generated in response to a user operating the configuration device, and the memory module may be arranged to store the trigger condition specified in a received configuration signal. The specified action and the specified trigger condition for the action may be communicated together as part of the same configuration signal, or alternatively may be communicated separately as separate configuration signals. Alternatively, specified trigger condition(s) may be stored in a separate memory module, which may be in a different location to the memory module used to store the specified action(s).

The processor may be arranged to determine whether or not the trigger condition has been met. The processor may therefore generate the control signal in response to its own determination that the trigger condition has been met. Alternatively, or in addition, the processor may be arranged to receive a signal indicating that the trigger condition has been met, the determination having been made outside the processor. In this case, the determination may be made, for example, by a cloud based system or a portable communications device such as a mobile phone.

The memory module may be arranged to store a specified trigger condition related to a vehicle parameter or an environment parameter. The selected action may therefore be carried out automatically when the selected vehicle parameter and/or environment parameter is detected. Vehicle parameters are parameters that are related to the status and operation of the vehicle and its various sensor systems. Environment parameters are parameters that are related to the vehicle's environment.

The vehicle parameters that can be specified may include at least one of: power state of the vehicle; vehicle location; vehicle speed; trip distance; trip duration; distance to destination; time to destination; proximity of the vehicle to a specified person, device or other vehicle; vehicle occupancy; detection of one or more specified portable devices in proximity to the vehicle; operational status of a vehicle system (such as fuel level, engine speed, engine temperature or cabin lighting); output of a vehicle sensor (such as a cabin temperature sensor, an external air temperature sensor or a parking sensor); and receipt of a signal transmitted to the vehicle (such as an incoming call or text message). The environment parameters that can be specified may include at least one of: time; day; date; user-defined time period; temperature at the vehicle's location; temperature at another specified location; weather at the vehicle's location; weather at another specified location; location of a specified person, device or other vehicle; and fuel price at a location near to the vehicle.

Vehicle occupancy may be determined, for example, by detecting personal devices associated with particular people in proximity to the vehicle, for example a mobile phone, smartwatch, Fitbit, or other hand-held or wearable device.

Where the trigger condition comprises vehicle occupancy or detection of one or more specified portable devices in proximity to the vehicle, a control signal demanding a particular action may be outputted only if a particular device, for example the portable configuration device used to select that action, is detected in proximity to the vehicle. In this way it may be possible to configure the shortcut system to output a control signal demanding a particular action only if the person that selected that action is present in the vehicle.

Vehicle parameters and environment parameters may be measured directly by the vehicle, for example using vehicle sensors, and/or determined externally to the vehicle and communicated to the vehicle and/or the processor.

The memory module may be arranged to store a specified trigger condition related to the operation of a user operated control device. The control device may be comprised in the vehicle. In this case the control device may be any type of in-vehicle HMI, for example, a programmable shortcut button or a control element for a specific vehicle system or a main infotainment system. Alternatively, the control device may be separate to the vehicle, and may instead be, for example, a key fob, a mobile phone, a smartwatch, a Fitbit, or another hand held or wearable device. In some cases, the control device may also act as the configuration device.

The operation may be, for example, a specified action carried out using either a physical control element of the control device (such as a button) or a virtual control element of the control device (such as a virtual button on a touch screen interface). The operation may be a specified gesture, which may be carried out, for example, on a touch screen or in proximity to a movement sensor or while holding or wearing a portable device.

For the avoidance of doubt it is noted that the operation of a user operated control device does not constitute a vehicle parameter.

The memory module may be arranged to store a specified trigger condition including multiple separate requirements. The multiple separate requirements may, for example, include one or more vehicle parameters and/or one or more environment parameters and/or one or more control device operations. In this case the shortcut system may be configured to output a control signal only if all of the requirements specified for a particular action are detected. For example, it may be possible to configure the control system to open a window only if the external air temperature or cabin temperature is above a defined threshold and the vehicle speed is below a defined threshold.

The processor may be arranged to generate the control signal each time the trigger condition is met. In this way a single instruction of an action and a trigger condition may be used to pre-program an action to be carried out multiple times. However, some trigger conditions (for example "date") may be non-repeating, and it may be possible to program an action to be carried out only once (for example only the next time the trigger condition is met).

The input may be arranged to receive configuration signals from a plurality of different configuration devices independent of the vehicle. In this way it may be possible for two or more users of a vehicle to configure the shortcut system using their own configuration devices, or for a single user to configure the shortcut system using one of a number of configuration devices.

The processor may be arranged to generate the control signal in dependence on the power state of the vehicle. For example, the processor may be arranged to generate the control signal only if the vehicle has been switched on. Alternatively the processor may be arranged to generate the control signal upon the trigger condition being met irrespective of the power state of the vehicle, for example to preheat a vehicle before it is switched on for a morning commute.

According to a further aspect of the present invention there is provided a shortcut system for controlling at least one vehicle system, the shortcut system comprising:
  an input arranged to receive a configuration signal generated in response to a user operating a configuration device, the configuration signal specifying an action to be carried out by a vehicle system;
  a memory module arranged to store the action specified in a received configuration signal;
  a processor arranged, upon a user-selected trigger condition comprising a vehicle parameter and/or an environment parameter being met, to generate a control signal for controlling the vehicle system in accordance with the stored specified action; and
  an output arranged to output the control signal.

The configuration device may be a configuration device independent of the vehicle, as described above. Alternatively, the configuration device may be an in-vehicle configuration device, for example a main infotainment system or other in-vehicle HMI. Any of the features described above in relation to the first aspect of the present invention may also apply to the second aspect of the invention.

According to a further aspect of the present invention there is provided a vehicle provided with a shortcut system as described above, the vehicle comprising a plurality of vehicle systems arranged to be controlled in accordance with the control signals generated by the processor. The vehicle may be a car.

The memory module and/or the processor may be comprised in the vehicle. Alternatively, the memory module and/or the processor may be external to the vehicle, in which case the processor may be arranged to communicate the control signal to the control system of the vehicle and/or individual vehicle systems wirelessly. In this case the memory module and/or the processor may be comprised in a cloud based system or a portable communications device such as a mobile phone. In some cases the memory module and/or the processor may be comprised in an external device that also acts as the configuration device, in which case the selection of the desired action and trigger condition and the generation of control signals may occur in the same device.

According to a further aspect of the present invention there is provided a configuration device independent of a vehicle that is arranged to configure a shortcut system for controlling at least one vehicle system of the vehicle, the configuration device comprising:
  an interface arranged to be operated by a user to select a) an action to be carried out by a vehicle system and b) a trigger condition for the action;
  a processor arranged to generate a configuration signal for configuring the shortcut system, the configuration signal specifying an action to be carried out by a vehicle system and a trigger condition for the action in dependence on the action and trigger condition selected by a user at the interface; and
  an output arranged to output the configuration signal.

The configuration device can be used to remotely configure the shortcut system according to the first or second aspect of the present invention. The configuration device may be arranged to configure a shortcut system including any of the features described above, and may include any features required for configuring such a shortcut system. As discussed above, it will be understood that the user is a normal user of the vehicle, and not a maintenance person.

The configuration device may be a mobile phone or other portable communications device, or a tablet device, or a lap-top computer, or a desk-top computer, or a smartwatch.

The configuration device may comprise a software program or application that is used to select the action to be carried out by a vehicle system and the trigger condition for the action. The software program or application may be arranged to allow the selection of a desired action from a plurality of different selectable actions relating to a plurality of different vehicle systems. Alternatively, the software program or application may be confined to selecting a particular action, or may be confined to selecting actions for a particular vehicle system. In this case the selection of an action may be performed simply by selecting or opening the software program or application that is specific to that action. The configuration device may comprise multiple different software programs or applications for selecting different actions and/or for selecting actions relating to different vehicle systems.

The interface may be a touch screen interface.

The configuration device may be arranged to present the user with a list from which the desired action may be selected and a list from which the desired trigger condition may be selected. For example, a list of selectable actions may be opened by selecting a first option (which may have an appropriate name such as "create action" or "select action"), and a list of selectable trigger conditions may be opened by selecting a second option (which may have an appropriate name such as "define trigger" or "select trigger").

The configuration device may be arranged to allow the user to select one or more actions by selecting a pre-set action option specifying the one or more pre-set actions and/or to allow the user to select the trigger condition by selecting a pre-set trigger option specifying a pre-set trigger condition.

The configuration device may be arranged to allow the user to create a new pre-set action option specifying one or more user-selected actions, and/or may be arranged to allow the user to create a new pre-set trigger option specifying a user-selected trigger condition. It may be possible to select a convenient title when creating a new pre-set action option or pre-set trigger option, for example "pre-heat car" for a pre-set action option specifying actions related to heating and "morning commute" for a pre-set trigger option related to a morning commute schedule. The configuration device may also be arranged to allow the user to modify or delete existing pre-set action options and/or existing pre-set trigger options.

The processor may be arranged to generate configuration signals for configuring multiple different shortcut systems used to control vehicle systems of multiple different vehicles associated with the configuration device. It may, therefore, be possible to configure shortcuts for multiple different vehicles using the same configuration device.

The configuration device may be arranged to communicate the configuration signals to the shortcut system wirelessly. Alternatively the configuration signals may be communicated via a wired connection.

According to a further aspect of the present invention there is provided a control system for controlling at least one vehicle system, the control system comprising a shortcut system as described above and a configuration device as described above.

According to a further aspect of the present invention there is provided a method of controlling at least one vehicle system of a vehicle, the method comprising:
 a user of the vehicle using a configuration device independent of the vehicle to select an action to be carried out by a vehicle system and a trigger condition for the action;
 generating a configuration signal specifying the selected action and the selected trigger condition;
 receiving the configuration signal at an input;
 storing the action and the trigger condition specified in the received configuration signal in one or more memory modules;
 determining that the trigger condition has been met;
 operating a processor to generate a control signal for controlling a vehicle system in accordance with the stored specified action in response to determining that the trigger condition has been met; and
 controlling the vehicle system in accordance with the stored specified action.

The method may be used when operating a shortcut system and/or a configuration device as described above. The method may include any method steps associated with the normal operation of such a shortcut system and/or configuration device.

According to a further aspect of the present invention there is provided a non-transitory computer readable storage medium comprising computer readable instructions for a computer processor to carry out the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
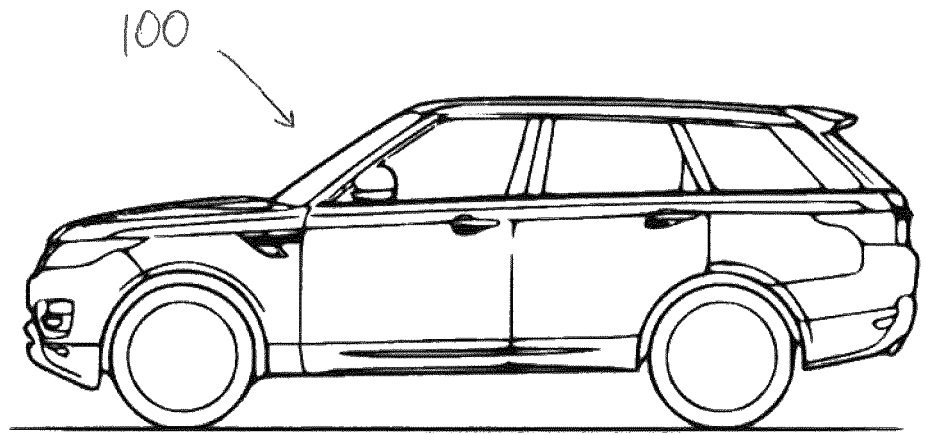
FIG. 1 illustrates a vehicle provided with a shortcut system according to one embodiment of the present invention.

FIG. 1 illustrates a vehicle 100 comprising plurality of vehicle systems that may be controlled by a user of the vehicle. These vehicle systems include, for example, an ignition system, a sat-nan system, a heating and air conditioning system, a seat heating system, a stereo system, an infotainment system, a seat configuration system, various vehicle camera systems, wing mirror control systems, a tow bar control system and a driving mode selection system, among others. It will be appreciated that these systems are merely illustrative, and that different vehicles may comprise different systems.

Figure 2:
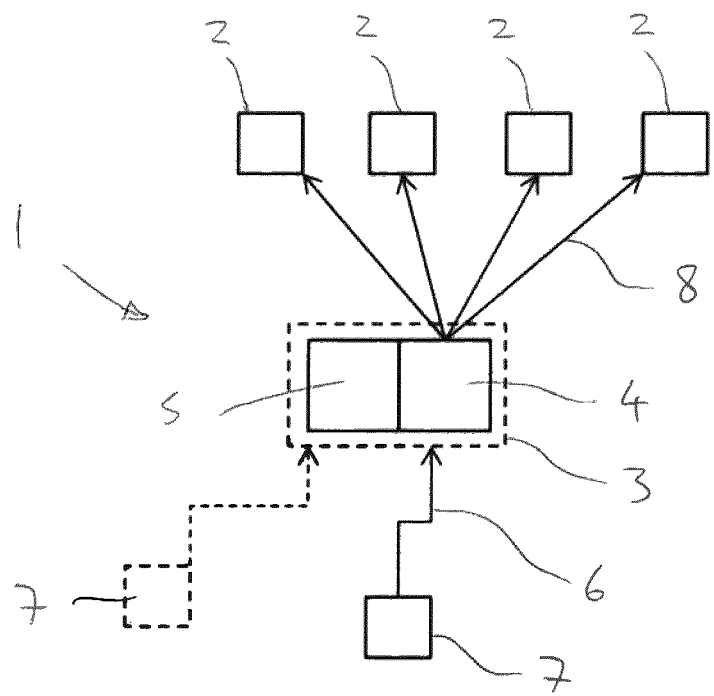
FIG. 2 illustrates a shortcut system according to one embodiment of the present invention.

As schematically illustrated in FIG. 2, the vehicle 100 is provided with a shortcut system 1 for controlling at least one of the vehicle systems 2 in accordance with an embodiment of the present invention. The shortcut system 1 comprises a control module 3 including a processor 4 and a memory module 5 provided within the vehicle 100. The control module 3 is arranged to wirelessly receive configuration signals 6 generated in response to a user operating a configuration device 7 independent of the vehicle (described in more detail below) at an input, the configuration signals specifying a) an action to be carried out by a vehicle system, and b) a trigger condition for the action. The memory module 5 is arranged to store the action and the trigger condition specified in the received configuration signals. The processor 4 is arranged to receive signals based upon which it is possible to determine whether or not the trigger condition has been met, and to determine whether or not the trigger condition has been met based on those signals. The processor 4 is arranged, upon determining that the trigger condition has been met, to generate a control signal 8 for controlling the vehicle system 2 to which the stored specified action relates in accordance with the stored specified action. The control signal 8 is then outputted by an output to the relevant vehicle system 2 or to another control module of the vehicle so that the relevant vehicle system 2 can be controlled in accordance with the stored specified action.

The shortcut system 1 therefore allows personalised actions to be carried out automatically according to user-selected preferences. For example, if the stored specified action is "turn engine on" and the stored specified trigger condition is that the time is 8:00 AM and the day is Monday to Friday, the shortcut system outputs a control signal to turn the engine on upon determining that the time is 8:00 AM and the day is Monday to Friday.

The stored specified action may comprise activating a specified vehicle system and/or setting a specified vehicle system to operate according to a selected mode of operation.

The stored specified trigger condition may relate to a vehicle parameter, for example power state of the vehicle; vehicle location; vehicle speed; trip distance; trip duration; distance to destination; time to destination; proximity of the vehicle to a specified person, device or other vehicle; vehicle occupancy; detection of one or more specified portable devices in proximity to the vehicle; operational status of a vehicle system (such as fuel level, engine speed, engine temperature or cabin lighting); output of a vehicle sensor (such as a cabin temperature sensor, an external air temperature sensor or a parking sensor); and receipt of a signal transmitted to the vehicle (such as an incoming call or text message). Vehicle occupancy may be determined, for example, by detecting personal devices associated with particular people in proximity to the vehicle. Alternatively, the stored specified trigger condition may relate to an environment parameter, for example time; day; date; user-defined time period; temperature at the vehicle's location; temperature at another specified location; weather at the vehicle's location; weather at another specified location; location of a specified person, device or other vehicle; and fuel price at a location near to the vehicle. Alternatively the stored specified trigger condition may relate to the operation of a user operated control device, for example a programmable shortcut button, a control element for a specific vehicle system, a vehicle infotainment system, a key fob, a mobile phone, a smartwatch, a Fitbit, or another hand held or wearable device. The operation may, for example, be an operation carried out on a physical or virtual control element. Alternatively the operation may be a specified gesture carried out on a touch screen or in proximity to a movement sensor or while holding or wearing a portable device.

The stored specified trigger condition may include multiple separate requirements (for example requirements related to one or more vehicle parameters and/or one or more environment parameters and/or one or more control element operations).

Optionally, the memory module 5 is arranged to store two or more specified actions (which may be for different, unrelated vehicle systems) to be carried out upon the trigger condition being met, and the processor 4 is arranged to generate control signals 8 in accordance with the stored two or more specified actions upon determining that the trigger condition has been met. In this way multiple actions may be demanded simultaneously. Optionally, the memory module 5 is also arranged to store two or more specified trigger conditions and a specified action to be carried out by a vehicle system corresponding to each trigger condition, and the processor 4 is arranged to generate a control signal for controlling a vehicle system in accordance with the stored specified action corresponding to one of the trigger conditions upon determining that the relevant trigger condition has been met. In this way multiple different actions may be demanded under different pre-selected conditions.

In some cases, an action stored in the memory module 5 of the shortcut system may be a repeating action, in which case the processor 4 may output a control signal for that action each time the trigger condition is met. For example, if the stored specified action is "turn engine on" and the stored specified trigger condition is that the time is 8:00 AM and the day is Monday to Friday, the processor may output a control signal to turn the engine on at the specified time every day from Monday to Friday each week. Alternatively, it may be possible to request an action to be carried out only once, for example the next time the trigger condition is met only. In addition, it will be appreciated that some selectable trigger conditions may be non-recurring (for example those including a date).

Figure 3:
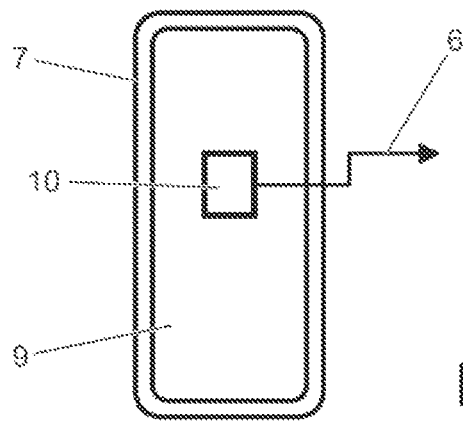
FIG. 3 illustrates a configuration device according to one embodiment of the present invention.

In the present embodiment, the configuration device 7 is independent of (that is not part of) the vehicle, and takes the form of a mobile phone, as illustrated in FIG. 3. The mobile phone comprises a software program or application that is used to select the desired action(s) and corresponding trigger condition(s) for the action(s). The mobile phone 7 includes a touch screen interface 9 at which a user of the vehicle can select the desired action(s) and trigger condition(s). The mobile phone 7 includes a processor 10 arranged to generate configuration signals 6 for configuring the shortcut system 1 described above, the configuration signals specifying the action(s) and trigger condition(s) as selected by the user at the interface 9. The mobile phone 7 comprises an output arranged to output the configuration signals wirelessly to remotely configure the shortcut system 1. The mobile phone/configuration device 7 can therefore be used to pre-program personalised actions from outside the vehicle 100, for example to select one or more actions desired for a morning commute before entering the vehicle.

Figure 4:
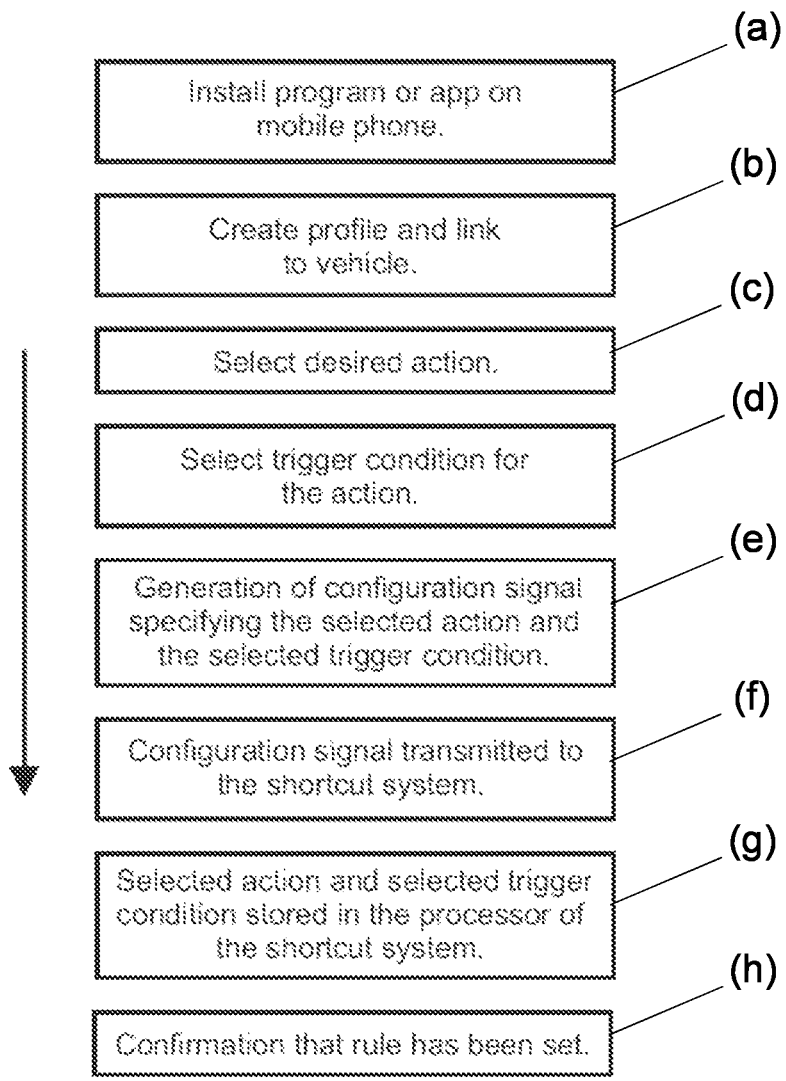
FIG. 4 illustrates a method of configuring a shortcut system according to one embodiment of the present invention.

The mobile phone 7 may be used to configure the shortcut system as illustrated in the flow chart of FIG. 4 and as described below:

a) The program or app is installed on the mobile phone 7;
b) The user creates a profile and links the app to their vehicle 100;
c) The user selects the action that they wish to pre-program to their vehicle;
d) The user selects the desired trigger condition for the action;
e) The processor 10 of the mobile phone generates a configuration signal 6 specifying the selected action and the selected trigger condition;
f) The configuration signal 6 is transmitted wirelessly to the shortcut system 1;
g) The selected action and the selected trigger condition specified in the configuration signal 6 are stored in the memory module 5 of the shortcut system 1; and
h) The mobile phone 7 confirms that the action and trigger condition have been set.

Figure 5A:
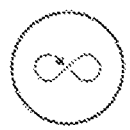
FIG. 5a-c illustrates lists from which actions and trigger conditions may be selected according to one embodiment of the present invention.
Figure 5A:
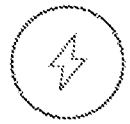
Figure 5B:
Figure 5B:
Figure 5B:
Figure 5B:
Figure 5B:
Figure 5B:
Figure 5C:
Figure 5C:
Figure 5C:
Figure 5C:
Figure 5C:
Figure 5C:
Figure 5C:
Figure 5C:
Figure 5C:
Figure 5C:
Figure 5C:
Figure 5C:

The step of selecting an action may comprise selecting an action from a list of selectable actions. For example, a user may select an option of "select action" or "create action" (as shown in FIG. 5*a*) to open a list of specific actions that can be selected and/or types of actions (as shown in FIG. 5*b*). Selecting a type of action may open a further list containing specific actions that can be selected. Similarly, the step of selecting a trigger condition may comprise selecting a trigger condition from a list of selectable trigger conditions. For example, a user may select an option of "select trigger" or "define trigger" (as shown in FIG. 5*a*) to open a list of specific trigger conditions that can be selected and/or types of trigger condition (as shown in FIG. 5*c*). Selecting a type of trigger condition may open a further list of specific trigger conditions that can be selected. It will be appreciated that the various options shown in FIGS. 5*a* to 5*c* are illustrative only, and that different options (or the same options under different names) may be included in other embodiments of the present invention.

As an example, the user could select an action of "turn engine on" and a trigger condition of the time being 8:00 AM to configure the shortcut system to warm the vehicle up automatically (and without the vehicle having been switched on by the user) for a morning commute.

In some cases, the step of selecting the trigger condition may include selecting multiple separate requirements. For example, the user could select a trigger condition of the time being 8:00 AM and the day being Monday to Friday to match a commuting schedule. The user could also select a further requirement of the ambient temperature being within a selected range or below a selected threshold to only pre-heat the vehicle on cold days. In this case the specified action is only commanded if all of the requirements of the trigger condition are determined to have been met.

In some cases, the step of selecting an action may include selecting multiple separate actions. For example, the user could select both "turn engine on" and "heat driver seat" to additionally warm the driver seat before a morning commute.

As an alternative to selecting one or more specific actions and a specific trigger condition individually, it may also be possible to select one or more actions by selecting a pre-set action option specifying one or more pre-set actions and/or to select the trigger condition by selecting a pre-set trigger option specifying a pre-set trigger condition.

For example, it may be possible to select a group of one or more actions associated with heating a vehicle by selecting a pre-set action option of "pre-heat car", the pre-set action option of "pre-heat car" specifying the one or more actions associated with heating the vehicle. A group of actions specified under "pre-heat car" may, for example, include one or more of "turn engine on", "turn heating system on", "heat driver seat", and "heat rear windscreen". The pre-set action option of "pre-heat car" may have been previously created and/or modified within the app by the user to select one or more actions that are typically desired as part of a pre-heating routine.

It may also be possible to select a desired schedule of 8:00 AM on Monday to Friday by selecting a pre-set trigger option of "morning commute" specifying the commuting schedule. The pre-set trigger option of "morning commute" may also have been previously created and/or modified within the app by the user based on a known commuting schedule.

The steps of selecting an action and selecting a trigger condition may be carried out multiple times in order to store multiple different rules, each including at least one action and a trigger condition for the action. For example, in addition to the various pre-heating operations described above, the user may additionally select an action of turning the radio on and setting the radio to a specified radio station in response to the vehicle being turned on during a week-day morning.

It will be understood that the various methods and configurations described above for selecting actions and trigger conditions and configuring the shortcut system are merely examples. The actual method steps may vary according to different embodiments of the invention, and other actions and trigger conditions may be selected, as desired.

The mobile phone 7 may be arranged to configure shortcut systems 1 for multiple different vehicles 100. In this case, the step of linking the app to a vehicle 100 may be carried out multiple times for the various different vehicles. Where a configuration device 7 is linked to multiple different vehicles, it may be possible to select which vehicle 100 a shortcut should apply to when selecting an action and a trigger condition in order to configure the shortcut system 1 of only one vehicle 100. Alternatively, it may be possible to select multiple vehicles 100 in order to configure the shortcut systems 1 of multiple vehicles simultaneously.

There may be multiple different configuration devices 7 linked to the vehicle 100 to configure the shortcut system 1, for example the mobile phones of multiple different users. (FIG. 2 schematically illustrates a second configuration device 7 in dashed lines.) In this case, the shortcut system 1 may prioritise the control of vehicle systems 2 based on the detection of one or more of the configuration devices 7 in proximity to the vehicle 100. For example, if two different configuration devices 7 are used to configure the shortcut system 1 and both devices are detected in proximity to the vehicle, the shortcut system may be arranged to prioritise the selections made using a specified one of the devices.

In the above-described embodiment, the processor 4 of the shortcut system 1 is arranged to determine whether or not the trigger condition has been met. In the case where the trigger condition includes the time being 8:00 AM and the day being Monday to Friday, the processor 4 of the shortcut system 1 may receive signals indicating the time and the day of the week, and may use those signals to determine that the corresponding action of pre-heating the vehicle should be carried out. However, in other embodiments, the processor 4 may be arranged to receive a signal indicating that the trigger condition has been met, the determination having been made outside the processor. The signal indicating that the trigger condition has been met may be sent wirelessly, for example, from a cloud-based system or from a portable communications device. In this case the memory module 5 of the shortcut system 1 need not be arranged to store the trigger condition, but may instead simply store the action. The trigger condition may instead be stored in a separate memory module, which may be in a different location to the memory module 5 used to store the specified action(s).

In the above-described embodiment, the processor 4 and the memory module 5 of the shortcut system 1 are comprised in the vehicle 100. However, in other embodiments, one or both of the processor 4 and the memory module 5 of the shortcut system 1 may be external to the vehicle 100. In this case the processor 4 and/or the memory module 5 of the shortcut system 1 may instead be comprised in a cloud based system or a portable communications device that communicates control signals to the control system of the vehicle 100 and/or to individual vehicle systems 2 wirelessly.

In the above-described embodiment, the configuration device 7 is independent of the vehicle 100 and takes the form of a mobile phone. However, in other embodiments, the configuration device may equally take the form of, for example, a tablet device, a lap-top computer, a desk-top computer, or a smartwatch. According to other embodiments, the configuration device may not be independent of the vehicle, but may instead be comprised in the vehicle, such that the desired actions and trigger conditions can be selected using controls of the vehicle, for example using a human machine interface (HMI) such as a touch screen interface on the dashboard. In some embodiments it may be possible to configure the shortcut system using both a configuration device independent of the vehicle and an in-vehicle configuration device.

Many modifications may be made to the above examples without departing from the scope of the present invention as defined in the accompanying claims.

The invention claimed is:

1. A shortcut system for controlling at least one vehicle system, the shortcut system comprising:
   i. an input configured to receive a configuration signal generated in response to a user operating a configuration device separate from the at least one vehicle system, the configuration signal specifying an action to be performed by the at least one vehicle system and a trigger condition for the action;
   ii. a memory module configured to store the action and the trigger condition for the action specified in the received configuration signal and wherein the memory module is further configured to store two or more specified actions to be performed by the at least one vehicle system, the two or more stored specified actions corresponding respectively to two or more different user-selected trigger conditions;
   iii. a processor configured, upon one of the two or more user-selected trigger conditions being met, to generate a control signal for controlling the at least one vehicle system based on one of the two or more stored specified actions corresponding to the one of the two or more user-selected trigger conditions and to prioritise the generation of the control signal based on vehicle occupancy and/or detection of at least two specified portable communication devices in proximity to the vehicle; and iv. an output configured to output the control signal.

2. A shortcut system according to claim 1, wherein the memory module is further configured to store a specified action to be performed by vehicle systems relating to at least one of: navigation, comfort, entertainment, interior configuration, security, vehicle cameras, wing mirror control, tow bar deployment/retraction, Advanced Driver Assistance Systems (ADAS) and telephone/media features.

3. A shortcut system according to claim 1, wherein the memory module is further configured to store a specified action comprising activating a specified vehicle system of the at least one vehicle system.

4. A shortcut system according to claim 1, wherein the memory module is further configured to store a specified action comprising setting a specific vehicle system to operate according to a selected mode of operation.

5. A shortcut system according to claim 1, wherein the processor is further configured, upon the user-selected trigger condition being met, to generate control signals for controlling the at least one vehicle system based on the two or more stored specified actions.

6. A shortcut system according to claim 1, wherein the memory module is further configured to store a specified user-selected trigger condition corresponding to the operation of the user operated configuration device; and wherein the memory module is further configured to store a specified user-selected trigger condition including multiple separate requirements.

7. A shortcut system according to claim 1, wherein the processor is further configured to generate the control signal each time the trigger condition is met; and wherein the processor is further configured to generate the control signal based on a power state of the vehicle.

8. A shortcut system according claim 1, wherein the input is configured to receive configuration signals from a plurality of different configuration devices that are separate from the vehicle.

9. A shortcut system according to claim 1, wherein the processor is further configured to determine whether or not the user-selected trigger condition has been met.

10. A vehicle provided with a shortcut system according to claim 1, the vehicle comprising a plurality of vehicle systems configured to be controlled based on the control signal generated by the processor.

11. A shortcut system according to claim 1, wherein one of the one or more specified portable communications devices is the configuration device.

12. A shortcut system according to claim 1, wherein the processor is further configured, upon a user-selected trigger condition being met, to generate the control signal for controlling at least one of the at least one vehicle system based on a stored specified action, based on the configuration device used to specify the stored action and trigger condition being detected in proximity to the vehicle.

13. A control system for controlling at least one vehicle system, the control system comprising a shortcut system according to claim 1; and the configuration device that is separate from the vehicle and is configured to configure the shortcut system for controlling the at least one vehicle system, wherein the configuration device comprises:

i. an interface configured to be operated by the user to select:

a) an action to be performed by the at least one vehicle system; and b) the trigger condition for the action;

ii. a processor configured to generate the configuration signal for configuring the shortcut system, the configuration signal specifying:

the action to be performed by the at least one vehicle system and the trigger condition for the action in dependence on the action and trigger condition selected by the user at the interface; and an instruction to perform the action in dependence on the configuration device being detected in proximity to the vehicle; and iii. an output configured to output the configuration signal.

14. A shortcut system according to claim 1, wherein the memory module is further configured to store a specified trigger condition corresponding to a vehicle parameter or an environment parameter.

15. A shortcut system according to claim 14, wherein the vehicle parameter that can be specified include at least one of: power state of the vehicle; vehicle location; vehicle speed; trip distance; trip duration; distance to destination; time to destination; proximity of the vehicle to a specified person, device or other vehicle; vehicle occupancy; detection of one or more specified portable communication devices in proximity to the vehicle; operational status of a vehicle system; output of a vehicle sensor; and receipt of a signal transmitted to the vehicle; and/or wherein the environment parameter that can be specified includes at least one of: time; day; date; user-defined time period; temperature at the vehicle's location; temperature at another specified location; weather at the vehicle's location; weather at another specified location; location of a specified person, device or other vehicle; and fuel price at a specified location.

16. A configuration device separate from a vehicle that is configured to configure a shortcut system for controlling at least one vehicle system of the vehicle, the configuration device comprising:

i. an interface configured to be operated by a user to select:

a) an action to be performed by at least one of the at least one vehicle system; and b) a trigger condition for the action;

ii. a processor configured to generate a configuration signal for configuring the shortcut system, the configuration signal specifying:

an action to be performed by the at least one vehicle system and a trigger condition for the action based on the action and trigger condition selected by the user at the interface; and an instruction to perform the action based on the configuration device being detected in proximity to the vehicle; and iii. an output configured to output the configuration signal.

17. A configuration device according to claim 16, wherein the configuration device is at least one of: a mobile phone or other portable communications device, a tablet device, a lap-top computer, a desk-top computer, a smartwatch, or a software program or application that is used to select the action to be performed by the at least one vehicle system and the trigger condition for the action.

18. A configuration device according to claim 16, wherein the processor is further configured to generate a further configuration signal for configuring multiple different shortcut systems used to control vehicle systems of multiple different vehicles.

19. A method of controlling at least one vehicle system of a vehicle, the method comprising:
  i. a user of the vehicle using a configuration device separate from the vehicle to select an action to be performed by the at least one vehicle system and a trigger condition for the action;
  ii. generating a configuration signal specifying the selected action and the selected trigger condition;
  iii. receiving the configuration signal at an input;
  iv. storing the action and the trigger condition specified in the received configuration signal in one or more memory modules, the one or more memory modules storing two or more specified actions to be performed by the at least one vehicle system, the two or more specified actions corresponding respectively to two or more different user-selected trigger conditions;
  v. determining that at least one of the two or more user-selected trigger conditions has been met;
  vi. operating a processor to generate at least one control signal for controlling the at least one vehicle system based on at least one of the two or more stored specified actions in response to determining that at least one of the two or more user-selected trigger conditions has been met, prioritizing the generation of control signals based on vehicle occupancy and detection of at least two specified portable communications devices in proximity to the vehicle; and
  vii. controlling the vehicle system based on the generated control signal.

20. A non-transitory computer readable storage medium comprising computer readable instructions for the processor to perform the method of claim 19.

\* \* \* \* \*